United States Patent [19]
Schlote

[11] Patent Number: 4,471,834
[45] Date of Patent: Sep. 18, 1984

[54] MODULAR SOLAR HEAT STORAGE CABINET

[76] Inventor: David D. Schlote, Box 158, Dittmer, Mo. 63023

[21] Appl. No.: 502,534

[22] Filed: Jun. 13, 1983

Related U.S. Application Data

[63] Continuation of Ser. No. 213,571, Dec. 5, 1980, abandoned.

[51] Int. Cl.³ .................... F28D 17/00; F24J 3/02
[52] U.S. Cl. .................................. 165/4; 165/10; 62/430; 126/400; 126/430; 126/436; 312/236
[58] Field of Search .............. 126/400, 429, 430, 435, 126/436; 165/4, 10, 485, DIG. 4, DIG. 25; 62/430, 438; 312/236, 263, 264

[56] References Cited

U.S. PATENT DOCUMENTS

| | | | |
|---|---|---|---|
| 1,425,174 | 8/1922 | Cartter et al. | 126/435 X |
| 2,638,754 | 5/1953 | Kleist | 126/400 X |
| 3,299,945 | 1/1967 | Rice et al. | 165/4 |
| 3,464,486 | 9/1969 | Rice et al. | 126/400 X |
| 4,088,266 | 5/1978 | Keyes | 126/400 X |
| 4,111,185 | 9/1978 | Swann | 126/400 X |
| 4,114,600 | 9/1978 | Newton | 126/400 X |
| 4,145,895 | 3/1979 | Hjertstrand et al. | 62/438 X |
| 4,170,261 | 10/1979 | Laing et al. | 126/400 X |
| 4,178,727 | 12/1979 | Prusinske | 165/DIG. 4 X |
| 4,203,489 | 5/1980 | Swiadek | 126/400 X |
| 4,205,656 | 6/1980 | Scarlata | 126/400 |
| 4,240,404 | 12/1980 | Franchina | 126/400 X |
| 4,248,291 | 2/1981 | Jarmul | 126/436 X |
| 4,262,653 | 4/1981 | Holland | 126/400 |
| 4,270,523 | 6/1981 | Van Heel | 126/435 |
| 4,271,824 | 6/1981 | Decker | 126/400 X |
| 4,287,942 | 9/1981 | Whitman | 126/400 X |
| 4,314,602 | 2/1982 | Frederick et al. | 165/10 |

Primary Examiner—Samuel Scott
Assistant Examiner—Margaret A. Focarino
Attorney, Agent, or Firm—Glenn K. Robbins

[57] ABSTRACT

A heat storage cabinet for use in solar heating systems and the like. The cabinet is comprised of a pair of open ended shells adapted to be buckled together with shelf like containers of phase change materials to form a tortuous passage for hot air to heat the phase change heat storage material. Intermediate modules may be used between the end cabinets to increase the heat storage capacity. The cabinets may be made of fiber glass with ledges to resiliently receive the phase change shelves for ready installation. Through appropriate top and bottom openings in the cabinet duct work is provided for connection to the building to be heated, hot water tank or the like. The novel construction of the phase change shelves comprises a flat shallow box like construction with internal fins for efficient heat transfer which facilitates installation in the end cabinets and intermediate modules whereby the shelves can be butted up against one another at the connection seams of the cabinet components in the erection of the cabinet in proper registry to form the tortuous passage within the cabinet.

6 Claims, 11 Drawing Figures

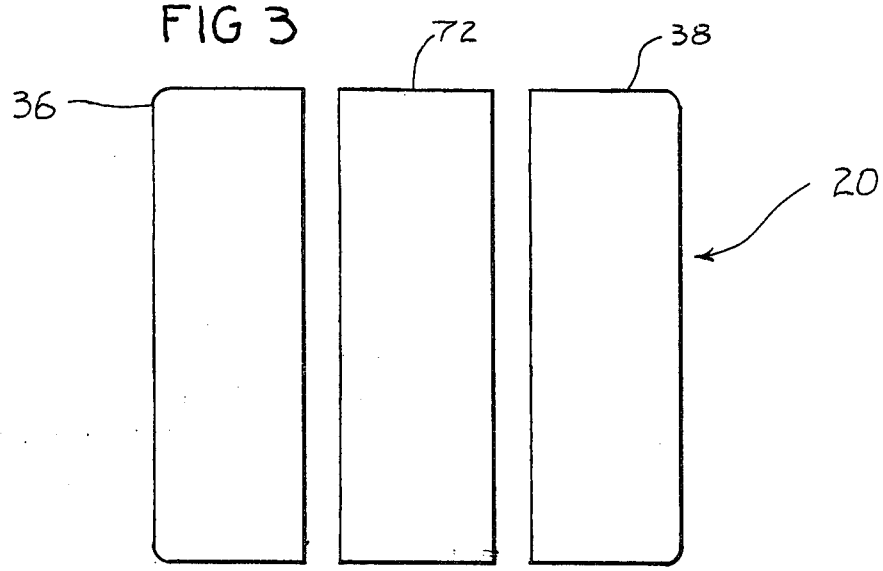
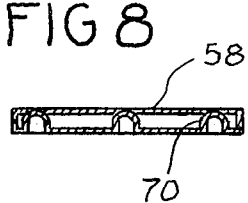
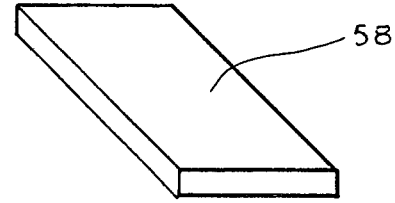
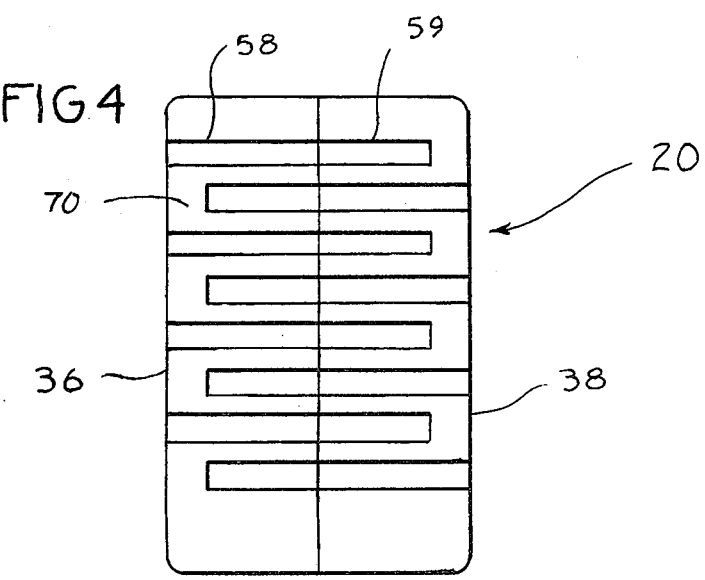

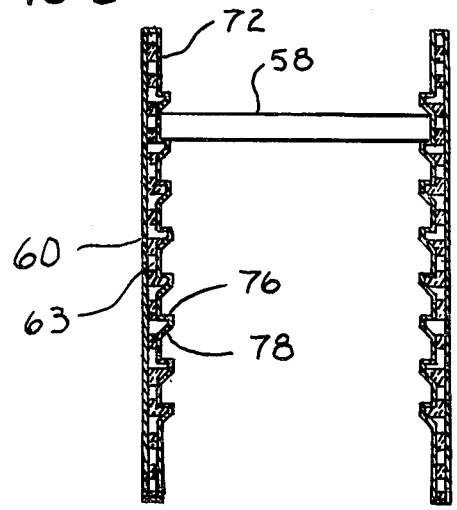
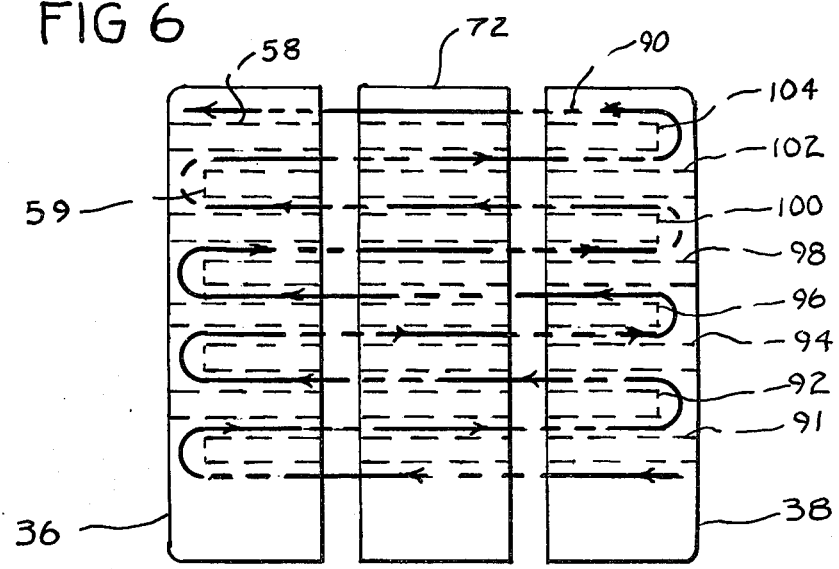

MODULAR SOLAR HEAT STORAGE CABINET

SUMMARY OF THE INVENTION

By means of this invention there has been provided a simply assembled heat storage cabinet for use with heating systems for storing heat from a source of heat for use in heating a building, water tank or other desired space or object to be heated. The heat storage cabinet may be conveniently employed in solar heating systems or any other system where there is an excess source of heat such as furnaces using any type of fuel where it is desired to store heat from a heat surplus source for distribution at a later time to the area to be heated.

The heat storage cabinet is particularly designed for employment with a phase change material of conventional composition where the heat energy distributed is latent heat rather than sensible heat in order to maximize the heat transfer efficiency. Such phase change materials are conventional and as an example paraffin wax may be employed as the phase change material in this invention.

The phase change material is stored in the heat storage cabinets in shallow rectangular containers or shelves which are supported within the cabinet in staggered vertical rows to provide a tortuous passage for the hot fluid such as hot air from the solar panels or the like used as the heating source for the heat storage cabinet. The shelves may be simply constructed of sheet metal to form the container which is filled with the phase change material. The sheet metal provides a simple means for construction and rapid heat transfer which combined with internal heat transfer fins make possible an effecient heat exchange system.

The heat storage cabinet is essentially constructed of two open box-like end cabinet sections which are adapted to be buckled together in sealed relation to provide a closed heat storage cabinet. Intermediate cabinet modules may be inserted between the end sections to increase the heat storage capacity as desired.

Each of the end cabinets is provided with side walls having flanges on interior wall surfaces to provide a rest or support which receives the shelves containing the phase change material in sliding relation in order that the shelves may be readily inserted in the cabinet sections.

The shelves are supported within the end cabinet sections with one end in flush relation to the open portion of the end cabinet in order that when the end cabinet sections are connected together the shelves in the end cabinet sections are butted together to define a passageway from one end of the cabinet to the other in a tortuous passage back and forth between the shelves. The shelves are in alternate horizontal rows butted to the end of the cabinet with openings being provided in the intermediate rows by spacing the shelves from the end of the cabinet. In this manner communication between the horizontal passage defined by the phase change container shelves is provided to establish a tortuous heat exchange path to maximize heat transfer between the hot fluid from the heat source and the phase change material container shelves.

The intermediate cabinet module is likewise provided with supports to receive the phase change material shelves. In the intermediate module the shelf is of a sufficient size to extend completely between the open opposite ends and to be in flush relation. By this relationship when the intermediate module, one or more in number as desired, is inserted between the end cabinet sections the heat storage shelves are all aligned and butted together to define the horizontal passageway defined by the aligned shelves.

The construction of the cabinet is provided by inner and outer fiber glass shells spaced from one another and filled with insulation which is desirably polyurethane. The rests or supports for the shelves may be in the form of angle irons or may be suitably formed from a mold to be an integral flange with the inner cabinet shell. Through the resiliency of the inner fiber glass shell a close friction fit with the shelf supported in the cabinets is provided through close tolerances which facilitates the sliding insertion of the shelves in the cabinet and their retention therein.

The heat storage cabinet has appropriate openings for duct work leading to the heat source such as a solar panel system to heat the phase change shelves. Further duct work may be connected to the space to be heated and to a back-up furnace. Suitable valving and instrumentations for opening and closing the duct work may be provided as desired.

The heat storage cabinet of this invention without the shelves may also be used as a hot water tank by joining the end cabinet sections together. When so used a cold water inlet duct is connected between the hot water tank to the heat storage cabinet and a heat exchanger. An outlet at the top of the heat exchanger is provided leading back to the hot water tank at an elevated portion and circulation is effected by natural convection.

The above features are objects of this invention. Further objects will appear in the detailed description which follows and will be further apparent to those skilled in the art.

For the purpose of illustration of this invention preferred embodiments thereof are shown in the accompanying drawing. It is to be understood that the drawing is for purpose of description only and that the invention is not limited thereto.

IN THE DRAWING

FIG. 3, is an exploded view in elevation showing the end cabinet sections with an intermediate cabinet module.

FIG. 4, is a view in vertical section of the cabinet of FIG. 1, showing the staggered shelf arrangement.

FIG. 5, is an enlarged fragmentary view in vertical section of the cabinet wall structure and flanges for supporting the shelves.

FIG. 6, is a view taken similarly to FIG. 3, showing the staggered shelf arrangement in dotted lines and tortuous flow of hot air from the solar unit.

FIG. 7, is a pictorial view of a phase change container shelf.

FIG. 8, is a view in vertical section taken through the shelf of FIG. 7, showing internal heat exchange fins.

DESCRIPTION OF THE INVENTION

Figure 1:
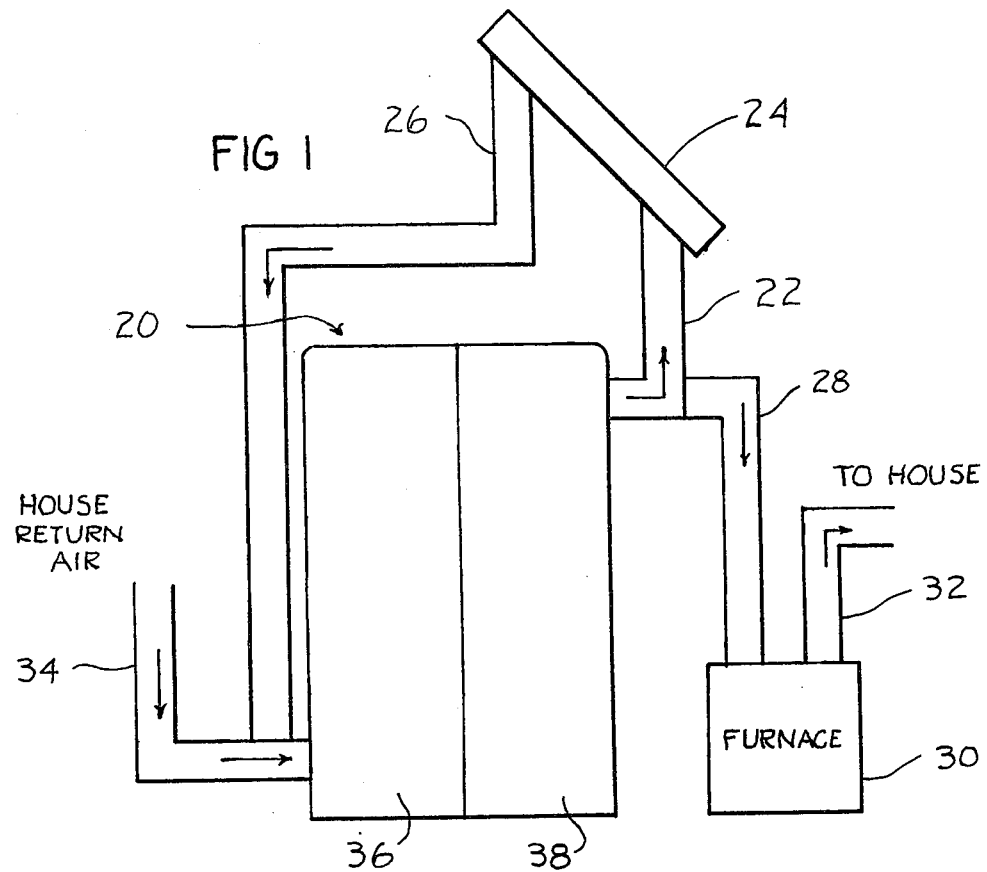
FIG. 1, is a view in elevation of the heat storage cabinet showing installation in a solar heating system for a house.
Figure 2:
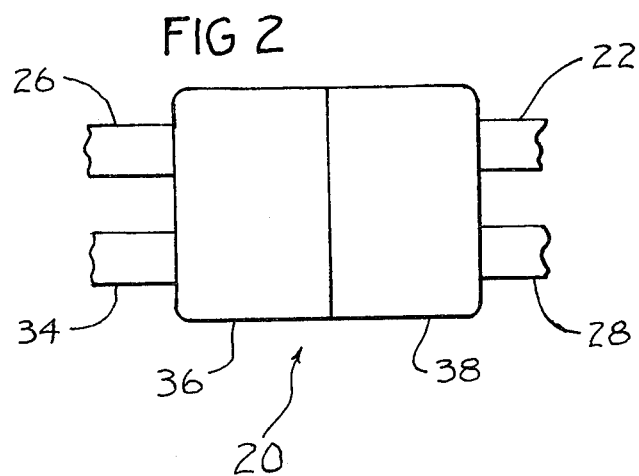
FIG. 2, is a top plan view of the cabinet of FIG. 1.
Figure 10:
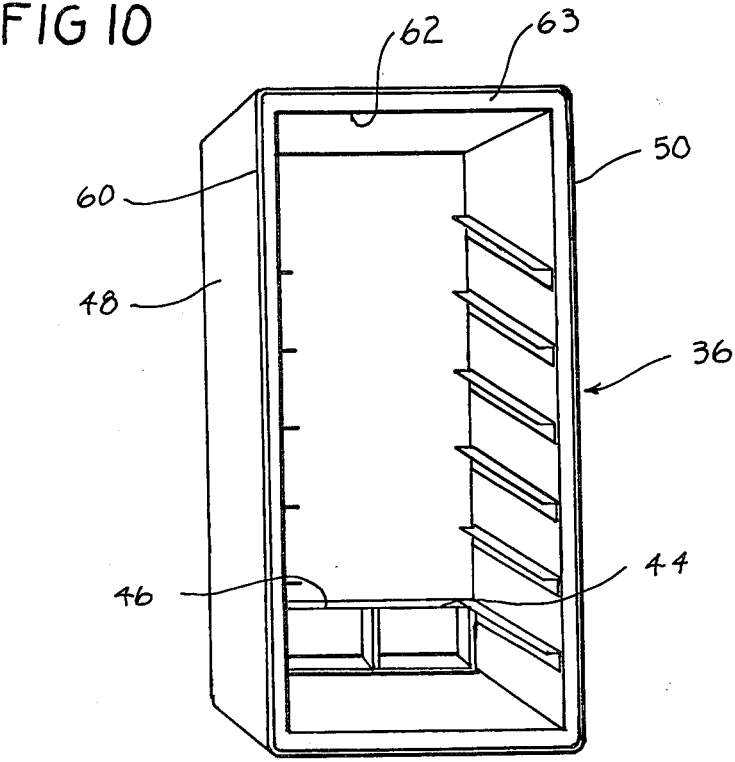
FIG. 10, is a view taken similarly to FIG. 9, showing a left hand cabinet end.
Figure 9:
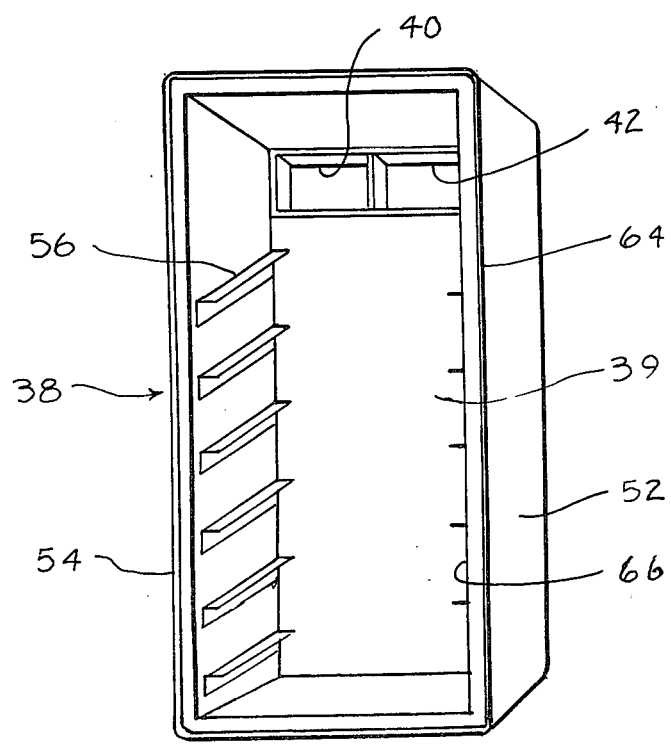
FIG. 9, is a pictorial view of a right hand cabinet end using a modified flange structure for supporting the phase change shelves.

The heat storage cabinet of this invention is generally indicated by the reference numeral 20 in FIGS. 1, 2, 3, 4 and 11. It is shown in FIGS. 1 and 2 connected by duct 22 leading from the top of the cabinet 20 to an inlet in a conventional solar panel 24 having an outlet 26 returning to the bottom of the cabinet 20. This duct work arrangement provides for distribution of the heat generated from the solar panel to the heat storage cabinet.

In order to provide for distribution of heat from the heat storage cabinet to a space to be heated, such as a house or the like, duct 28 leads from the top of the cabinet to furnace 30 and then by duct 32 to the house to be heated. It will be understood that by appropriate bypass duct work, valves, and thermostats which are conventional and not necessary to be shown as they form no part of the invention, per se, the furnace can be bypassed depending on the heat needs or caused to be operated. A return air duct 34 from the house is connected to the bottom of the cabinet.

The cabinet 20 as best shown in FIGS. 2, 3, 4, 9 and 10 is comprised of two shell-like end sections, namely, a left hand section 36 and a right hand section 38, which are adapted to be connected together by conventional fastening or affixation means to form a closed cabinet.

The right hand cabinet section is provided with an end wall 39 having openings 40 and 42 which receive ducts 22 and 28, respectively. The left hand cabinet section is provided with an end wall 43 having openings 44 and 46 which receive ducts 26 and 34, respectively. Suitable valves, not shown, may be provided as appropriate to close off the ducts as needed.

Each of the heat storage cabinet end sections has side walls opposed side walls, the left hand section 36 side walls being designated by the reference numerals 48 and 50 and the right hand section having side walls designated by the numerals 52 and 54. The side walls in each of the end cabinet sections are provided with shelf supports 56 which are in the form of flanges affixed to the side walls. The supports in each of the end cabinets are spaced from one another and in vertical registry with one another. The supports are employed to receive shelves 58 which contain the phase change material as will be more fully described hereinbelow.

The construction of the left hand end cabinet section 36 is provided by outer fiber glass shell 60 spaced from inner fiber glass shell 62 by polyurethane insulation 63. Similarly the right hand end cabinet section 38 is comprised of outer fiber glass shell 64 and inner fiber glass shell 66 separated by polyurethane insulation 68. The fiber glass shell construction makes possible a simple and rugged construction while making possible an efficient heat transfer barrier to prevent loss of heat. The insulation effectively spaces the fiber glass shells from one another and further enhances the heat insulating effectiveness. The fiber glass construction of the inner shell also provides a degree of resiliency in order that the shelves may be inserted on the support flanges and resiliently held thereon in snug and close engagement with the side walls.

The phase change material container shelves 58 are best shown in FIGS. 4 through 8. The shelves are constructed of sheet metal to provide a shallow box-like hollow shelf. The sheet metal provides rapid heat transfer which is enhanced by internal fins or ribs 70 to increase the heat transfer to the phase change material which is contained within the shelves. The phase change material may as an example be paraffin wax for latent heat when the phase change material changes between solid and liquid phase. It will be understood that other phase change materials may be used as well which will be readily understood by those skilled in the art.

The shelves for purpose of example may be of two sizes represented by shelf 58 shown in FIGS. 4 and 7 and shelf 59 shown in FIG. 4, the latter shelf 59 being slightly shorter than shelf 58 to provide an air gap between the stacks of horizontal shelves. In order to understand the size relationship the end sections may be in two foot modules with the side, walls being two feet wide, six feet high and separated from one another by a three foot distance. The shelves 58 may be about three feet long to fit between the side walls in the aforementioned snug fit when supported upon support ledges 56, about two feet wide to extend from the back of the cabinet to a flush position with the open end of the cabinet. The thickness of the shelf may be about four inches.

The shelves 59 are of less width than shelves 58 to provide the aforementioned air gap when installed in the end cabinet sections. For example, they may measure about one foot and a half to provide an air gap 70 of about four inches. The other dimensions may be the same as shelf 58.

The end cabinet sections may be used with one or more intermediate modules 72 as shown in FIGS. 3 and 6. The intermediate modules are of the same two foot width as the end cabinets and of the same fiber glass construction as the end sections. The modules are open at both ends in order that they may be interfitted and butted between the end sections. It will be understood that the side walls of the intermediate module 72 are similarly provided with the same supports 56 as in the end cabinets. The supports 56 are employed to support the shelves 58 in each of the horizontal layers in order that the shelves butt against adjacent shelves in the end cabinets to provide the horizontal shelf layers as viewed in FIG. 6.

A modified side wall construction is shown in FIG. 5. This construction comprises outer fiber glass shell 60 and specially fabricated inner fiber glass shell 72 spaced from the outer shell by polyurethane insulation 63. The inner shell 72 integral flange like supports 74 formed by an inwardly extending rest wall 76 and a lower wall 78 slanting backwardly to the shell wall 72.

Figure 11:
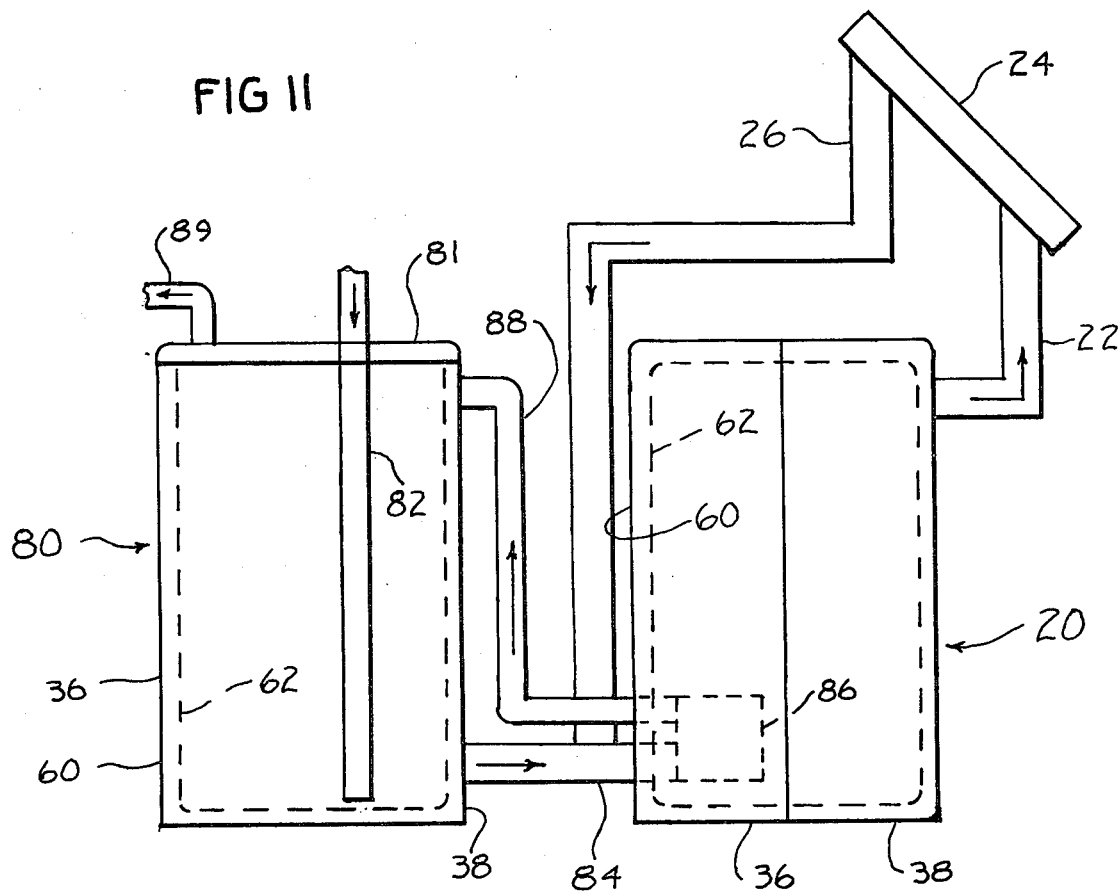
FIG. 11, is a view taken similarly to FIG. 1, showing the cabinet in a solar heating system for a water heating system using the cabinet as a water storage tank with the inner fiber glass shell shown in dotted lines.

The heat storage cabinet 20 is shown in FIG. 11 in an installation employing a hot water tank 80. The hot water tank 80 employs the same cabinet construction as previously described but without the cut out duct openings, 40, 42, 44 and 46. The cabinet is molded in cup shaped form and closed by a sealed top 81 of the same fiber glass construction as that previously described. The cabinet is simply sealed together and employed without the shelves as an insulated reservoir for hot water.

The tank 80 has a cold water inlet 82 terminating in closely spaced relation to the bottom of the tank. An outlet 84 leads from the bottom of the tank into the bottom area of the heat storage cabinet to a heat exchanger 86. Conduit 88 leads from the heat exchanger to a top portion of the hot water tank.

Circulation of the water from the bottom of the tank to the heat exchanger in the heat storage cabinet and to the top portion of the tank is effected through natural convection as the water is progressively heated. A hot water outlet 89 leads from the top of the tank to a distribution system as desired.

USE

The heat storage cabinet of this invention is very simply fabricated and installed in the plant or in the field as desired. In the installation of the shelves 58 and 59 in the two end cabinets 36 and 38, the shelves 58 and 59 are simply inserted on the supports in alternate, as best shown in FIGS. 4 and 6. By this alternate installation the automatic butting together relation is effected when the two cabinets are connected together at their open ends as shown in FIG. 4.

When the cabinets are connected together a tortuous passage 90 defined by the dotted line in FIG. 6 between the shelf layers 91, 92, 94, 96, 98, 100, 102, and 104 is established with communication of heat exchange fluid between the shelves being provided by the air gap 70.

Once the cabinet 20 has been erected the installation in the solar heating system of FIG. 1 is simply effected by the connection of the duct work shown therein. When the duct work has been established the heating fluid such as air, water or the like, passes as an example, in the form of heated air from solar panel 24 through duct 26 to the bottom of the heat storage cabinet. The hot air rises in the tortuous passage 90 past the phase change material container shelves 58 and 59 to impart heat thereto. In this process the heated air gives up heat. Return air to the solar panel is introduced back to the panel through duct 22.

In the installation of FIG. 1 return air from the house is introduced to the heat storage cabinet through duct 34 and passes through the tortuous path 90 to be heated and passed through duct 28 and 32 to the house to be heated. It will be understood that by appropriate thermostats, valving and the like the duct work to the solar panel and the house may be cut off, modulated or the like depending on the heat demands, outside solar heating conditions and other heating variables. Likewise the furnace 30 may be bypassed or cut into the system as desired. The installation shown in FIG. 1, thus is shown only as an exemplification or typical installation without limitation of the use of the heat storage cabinet in other systems.

The intermediate module 72 may be used alone or in multiples where desired. When used the heat capacity provided by the additional shelves 58 is substantially increased as more phase change material is provided as a heat reservoir for use when needed.

The installation of the intermediate module 72 is simply effected in substantially the same manner as previously described. Thus the shelves 58 are inserted such that they are flush with the open ends of the module 72. The module is then connected to the end cabinets 36 and 38 as shown in the exploded view of FIG. 6 to provide an extended tortuous passage 90. Additional modules 72 may be inserted as desired.

The use of the heat storage cabinet of this invention is shown in FIG. 11 in a hot water system. In this system the cabinet 80 is employed as an insulated simply fabricated hot water tank. In this system cold water is introduced through the tank 80 through cold water inlet 82 and passes by natural convection through conduit 84 to the heat exchanger 86 in the heat storage cabinet where it is heated and then is returned as hot water through conduit 88 to the hot water tank. Hot water is withdrawn as needed through hot water outlet 89.

Various changes and modifications may be made within this invention as will be readily apparent to those skilled in the art. Such changes and modifications are within the scope and teaching of this invention as defined by the claims appended hereto.

What is claimed is:

1. A heat storage cabinet for use in solar heating systems and the like which comprises first and second box shaped cabinet elements open at one end and adapted to be closed together in sealed relation at their open side to form a hollow cabinet, each of said cabinet elements having opposed side walls having support means for supporting heat members in spaced vertical rows extending between said side walls, said heat storage members further extending from said open end toward a rear wall of each of said cabinets, the rows of said heat storage members alternating between extending into contact with said rear wall and being spaced therefrom and staggered in said relationship between said first and second cabinet elements to form when said cabinet elements are closed together a tortuous vertical path past said heat storage members between alternate rows back and forth toward the rear walls of said cabinet elements, said cabinet being provided with at least one intermediate cabinet module between said first and second cabinet elements, said intermediate module having opposed side walls having support means for supporting heat storage members in spaced vertical rows extending between said side walls, said side walls having opposed ends adapted to be butted and sealed against the open ends of said first and second cabinet elements.

2. The heat storage cabinet of claim 1, in which the support means comprises flange elements connected to the side walls of said cabinet elements and said heat storage members are in the form of shallow rectangular shelves supported upon said flange elements and extend in substantially abutting relation between said side walls and said shelves supported in said intermediate cabinet module extend between said opposed open ends and substantially abut against and are aligned with shelves supported in said first and second cabinet elements.

3. A heat storage cabinet for use in solar heating systems and the like which comprises first and second box shaped cabinet elements open at one end and adapted to be closed together in sealed relation at their open side to form a hollow cabinet, each of said cabinet elements having opposed side walls having support means for supporting heat storage members in spaced vertical rows extending between said walls, said heat storage members further extending from said open end toward a rear wall of each of said cabinets, the rows of said heat storage members alternating between extending into contact with said rear wall and being spaced therefrom and staggered in said relationship between said first and second cabinet elements to form when said cabinet elements are closed together a tortuous vertical path for the passage of a heat exchange fluid past said heat storage members between alternate rows back and forth toward the rear wall of said cabinet elements, the support means comprising aligned flange elements connected to the side walls of each of said cabinet elements and said heat storage members being in the form of rigid shallow rectangular box-like shelves containing a phase change material supported upon said flange elements and extending between said side walls, said side walls comprising a hollow panel of fiber glass having an inner wall being resiliently deformable to receive said shelves in frictional engagement, said rectangular shelves being comprised of sheet metal and being provided with internal heat conducting members contacting said phase change material.

4. A heat storage cabinet for use in solar heating systems and the like which comprises a plurality of cabinet elements adapted to be closed together in sealed relation to form a hollow cabinet having opposed side walls, opposed end walls, a top and a bottom wall, said opposed side walls having support means for supporting heat storage members in spaced vertical rows extending between said side walls, said heat storage members further extending between said end walls of each of said cabinets, the rows of said heat storage members alternating between extending into contact with each of said end walls and being spaced therefrom and staggered in said relationship between said end walls for forming when said cabinet elements are closed together a tortuous vertical path for the passage of a heat exchange fluid past said heat storage members between alternate rows back and forth between the end walls of said hollow cabinet, the support means comprising aligned flange elements connected to each of the side walls and said heat storage members being in the form of rigid shallow rectangular box-like hollow metallic heat conductive shelves containing a phase change material supported upon said flange elements and having a width extending to and closely between said side walls, said side walls comprising a hollow panel of fiber glass having an inner fiber glass wall being resiliently deformable to receive said shelves in frictional engagement.

5. The heat storage cabinet of claim 4 in which said flange elements are fiber glass and are integrally formed with said inner wall.

6. A heat storage cabinet for use in solar heating systems and the like which comprises a plurality of cabinet elements adapted to be closed together in sealed relation to form a hollow cabinet having opposed side walls, opposed end walls, a top and a bottom wall, said opposed side walls having support means for supporting heat storage members in spaced vertical rows extending between said side walls, said heat storage members further extending between said end walls of each of said cabinets, the rows of said heat storage members alternating between extending into contact with each of said end walls and being spaced therefrom and staggered in said relationship between said end walls for forming when said cabinet elements are closed together a tortuous vertical path for the passage of a heat exchange fluid past said heat storage members between alternate rows back and forth between the end walls of said hollow cabinet, the support means comprising aligned flange elements connected to each of the side walls and said heat storage members being in the form of rigid shallow rectangular box-like shelves containing a phase change material supported upon said flange elements and extending between said side walls, said side walls comprising a hollow panel of fiber glass having an inner wall being resiliently deformable to receive said shelves in frictional engagement, said rectangular shelves being comprised of sheet metal and provided with internal heat conducting members contacting said phase change material.

* * * * *